United States Patent [19]

Takai et al.

[11] Patent Number: 5,338,357
[45] Date of Patent: Aug. 16, 1994

[54] FIBRE REINFORCED SHAPED SOLID ARTICLES

[75] Inventors: Yosuke Takai, Harima Kenkyujo, Japan; Josef Studinka, Zürich, Switzerland; Benoît de Lhoneux, Namur, Belgium

[73] Assignee: Polyfibre S.A., Nyon

[21] Appl. No.: 923,596

[22] Filed: Aug. 3, 1992

[30] Foreign Application Priority Data

Oct. 1, 1991 [JP] Japan ................................ 3-282268

[51] Int. Cl.$^5$ ............................................. C04B 16/06
[52] U.S. Cl. .................................... 106/724; 106/686; 691/696
[58] Field of Search .............. 106/686, 688, 691, 696, 106/724; C04B 16/06

[56] References Cited

U.S. PATENT DOCUMENTS

| | | | |
|---|---|---|---|
| 2,703,289 | 3/1955 | Willson | 106/696 |
| 4,261,754 | 4/1981 | Krenchel et al. | 524/8 |
| 4,306,911 | 12/1981 | Gordon et al. | |
| 4,407,676 | 10/1983 | Restrepo | 106/657 |
| 5,112,405 | 5/1992 | Sanchez | 106/725 |

FOREIGN PATENT DOCUMENTS

| | | |
|---|---|---|
| 0081265 | 6/1983 | European Pat. Off. |
| 0225036 | 6/1987 | European Pat. Off. |
| 0343148 | 11/1989 | European Pat. Off. |

OTHER PUBLICATIONS

"Fibre Reinforced Ceramic Composites" *Ceramic Bulletin* vol. 54 No. 3 (1975) Lankard pp. 271–276.
"Manufacture of Fibre Reinforced Cement Plate" Kato Chemical Abstract (Aug. 14, 1991) JA 01-258429.
Chemical Abstract "Inorganic Processed Board" Nakagawa JA 63-97668 (Jan. 23, 1990).
Chemical Abstracts, vol.94, 1981, Columbus, Ohio, US; abstract No. 51914z, J. Balslev et al 'polypropylene fibers for reinforcing construction material' p. 297.

*Primary Examiner*—Mark L. Bell
*Assistant Examiner*—Paul Marcantoni
*Attorney, Agent, or Firm*—Cushman, Darby & Cushman

[57] ABSTRACT

The invention relates to shaped solid articles manufactured with a hydraulically setting composition comprising water, hydraulic binders and reinforcing fibres and moreover process fibres in an amount of 0–10 wt % with respect to total dry mix and fillers in an amount of 0–50 wt % with respect to total dry mix wherein the reinforcing fibres comprise from 0.1 to 5 wt % with respect to total dry mix of highly crystalline polypropylene fibres possessing a fibre breakage strength of over 490 N/mm$^2$, having $Q<5$ and $97<HI<100$, and $94<IPF<100$, Q being the ratio of weight-average molecular weight to number-average molecular weight, HI being the boiling n-heptane insoluble content in wt % with respect to the total polymer and IPF being the isotactic pentad fraction in mol %.

16 Claims, No Drawings

FIBRE REINFORCED SHAPED SOLID ARTICLES

The invention relates to a new building material mixture for the preparation of fibre reinforced shaped solid articles, to a process for the manufacturing of said shaped articles and to the shaped solid articles manufactured using said new building material mixture.

BACKGROUND OF THE INVENTION

It is generally known that articles, shaped in the most varied ways, such as slates, flat cladding sheets or corrugated roofing sheets, purlins, pipes or other shaped articles can be produced from aqueous suspensions of mixtures comprising hydraulic binders, fillers and reinforcing fibres.

Amongst the conventional construction materials, fibre-reinforced cement articles manufactured using asbestos and cement have already been known for decades. In the asbestos cement industry, processes based on the winding process of L. Hatschek (Austrian Patent Specification 5,970) are still the most widespread techniques for the manufacture of construction elements. The technology of this production process is described exhaustively, for example, in the book by Harald Klos entitled Asbestzement ("Asbestos Cement"), Springer Verlag, 1967. Other processes applicable are for example Magnani, Mazza, Flow-on, extrusion and injection.

The Hatschek process for the manufacture of, for example, asbestos cement sheets is based on the use of cylindrical screen dewatering machines. In this process, a mat made from a dilute asbestos cement suspension contained in a vat is transferred to a felt, via a sieve cylinder, and is wound up to the desired thickness with the aid of forming drums. For the manufacture of corrugated sheets, the asbestos cement sheet formed on the forming drum is cut off from the same after the desired thickness has been reached. This sheet is then formed into shape and left to harden between oiled corrugated metal templates.

Asbestos has both, reinforcing properties linked to its intrinsic tensile strength and also process qualities related to the excellent dispersion capability in an aqueous cement suspension. During the dewatering step, because of the good filtration properties and the good cement affinity, asbestos fibres can hold back the fine particles in the suspension of the composite mixture which is being formed. In the hydrated end product, the high tensile strength combined with the high modulus of elasticity and the small elongation at break contribute to give asbestos cement articles the known high bending strength.

In the past few years, however, asbestos has become an undesirable component for reasons related to environment and health and major efforts have been invested in attempts to substitute it.

During recent years, an intensive research activity has been pursued to find substitution fibres which can partially or totally replace asbestos in existing production processes based on dewatering methods.

It is thus desirable to use new fibres as reinforcing agents and also as processing aids for use with hydraulic binders, for example for reinforcing cement. These fibres must be able to confer to fibre-containing articles the desired mechanical properties, which were formerly obtained with asbestos.

The requirements to be satisfied by fibres which are suitable for reinforcing cement and other hydraulically setting binders are exceptionnally high.

The following properties characterize asbestos both as reinforcing and processing fibre in the dewatering technology:
1) regarding processing qualities:
   high specific surface
   good dispersing ability
   excellent chemical resistance and durability
   high cement retention capacity
   X good layer formation capacity
2) regarding reinforcing qualities:
   high tensile strength
   high modulus of elasticity
   low elongation at break Concerning chemical requirements, alkali resistance in saturated calcium hydroxide solutions at elevated temperature is, in particular, an absolute prerequisite.

No other natural or synthetic fibres have been found that exhibit the combination of all the properties of asbestos fibres. It is now known that the replacement of asbestos requires two distinct types of fibres corresponding to the two main functions of asbestos (see for example DE 3.002.484). The filtration properties of asbestos can be reproduced through additions of natural or synthetic pulps for example cellulose alone and/or synthetic fibrids. Selected reinforcing fibres are used for the composite reinforcement. These may be organic or inorganic high modulus fibres which are usually cut in lengths of from 1 to 15 mm.

Many synthetic fibres have been tested for the reinforcement of cement; unfortunately, most have given poor or unsatisfactory results for a number of reasons like insufficient chemical resistance, poor cement affinity, insufficient mechanical properties in particular the insufficient intrinsic tenacity and elastic modulus and an excessive elongation at break. The high price is very often a limiting factor for industrial applications.

Furthermore, the physical characteristics of the fibres should be compatible as regards important properties, with those of the hydraulic binders. In the case of cement, it is known that this material has a certain brittleness and, for example, can break at an elongation of about 0.03%. According to previous art, a reinforcing fibre must have a higher initial modulus than the elastic modulus of the hydraulic binder.

In addition to the abovementioned physical properties of fibres, it is likewise important that the fibres can readily be dispersed in a dilute aqueous cement suspension and also remain uniformly dispersed on adding further additives, if these fibres are to be processed by draining processes to give fibre cement products.

The literature already contains innumerable publications on the use of various natural, synthetic, organic and inorganic fibres. Fibres made of cotton, cellulose, polyamide, polyester, polyacrylonitrile, polypropylene and polyvinyl alcohol, inter alia, have already been investigated for reinforcing cement. Likewise, work with fibres made of glass, steel, aramide and carbon is known. Of all these fibres, none has hitherto had all the requirements needed, especially for cement.

For example, glass has a low chemical stability, steel shows corrosion and has a too high density, carbon is too brittle, shows low adhesion and has a high price, cellulose has insufficient durability, polyethylene and standard polypropylene have insufficient tensile strength.

To date, there are mainly two types of synthetic fibres which satisfy the requirements for the reinforcement of cement. Both are high modulus fibres based on polyvinyl alcohol (or PVA) and polyacrylonitrile (or PAN) polymers alone (GB 2.850.298) or in combination. The first is available for example, under the trade mark Kuralon ® from the firm Kuraray, Japan (DE 2.850.337), an example of the second is Dolanit ® produced by Hoechst, Germany.

These fibres are characterized by a high tenacity and a low elongation at break as illustrated hereinbelow.

|  | PVA | PAN |
| --- | --- | --- |
| Tenacity N/mm$^2$ | 1550 | 910 |
| Initial modulus N/mm$^2$ | 37000 | 17000 |
| Elongation at break (%) | 7.4 | 9.0 |

In the field of fibre-cement, it is known that the mechanical strength is lowest when the composites are in the wet state (a common situation when exposed in the environment) and thus International Standards often require measurements to be done in water saturated conditions. In addition, the energy of fracture is also a very important property because it provides evidence of the impact toughness of the article.

PVA fibres with the better mechanical properties not only give a higher bending strength in the wet state but the energy of fracture is much higher than in the case of PAN fibres. The energy of fracture is defined as the area under the stress strain curve up to the point at which the maximum bending strength is reached, i.e. when the composite is ruptured.

The shortcoming of PVA fibres is their sensitivity to water at high temperature and their high price. Shaped articles reinforced by PVA show excellent mechanical properties in the dry state but the high level of bending strength decreases in wet state.

In view of the correlations between fibres data and the resulting article properties, it is relatively simple to produce fibre-cement articles upon which high standards are set as regards bending strength, impact toughness and energy of fracture using exclusively PVA as reinforcing fibres. PVA fibres are indeed very expensive (at least 50% higher than the less efficient PAN fibres). One patented solution proposed was to use selected mixtures of both PVA and PAN which give better results than expected from the law of mixtures (EP 0.155.520).

Although this solution is attractive from the economical point of view, the energy of fracture remains still at the lower level.

The object of the present invention is to provide fibre reinforced shaped solid articles which avoid the disadvantages of the prior art, e.g. low energy of fracture in the wet state and high price.

Based on the rule of mixtures for strength of a fibre-matrix composite, only high modulus and high tenacity fibres have been used so far for the manufacturing of fibre-cement articles with high bending strength.

A pure cement matrix has an E-modulus of 15000 N/mm$^2$. Therefore, according to the rule of mixtures for a fibre-cement composite, it must be assumed that the E-modulus of the reinforcing fibre must be higher than 15000 N/mm$^2$. This theorical assumption has also been confirmed to date by practical experience.

In this view, it has always been asserted that in general, polypropylene fibres are technically poor when it comes to reinforcing cement based materials in direct tension or flexure in the relatively brittle matrix of cements and mortars. Indeed, it was altogether improbable to get results comparable to high modulus polyvinyl alcohol (PVA) fibres which are the best asbestos substitute to date.

SUMMARY OF THE INVENTION

It has been surprisingly and unexpectedly discovered that stereo regular polypropylene fibres with a tenacity comparable to PAN fibres especially with a much lower elastic modulus and a higher elongation at break gives results equal to or better than PVA fibres. The high level of these results is especially apparent when the composites are tested in the worst conditions i.e. water saturated.

The subject matter of the present invention is a shaped solid article manufactured with a hydraulically setting composition comprising water, hydraulic binders and reinforcing fibres and moreover process fibres in an amount of 0–10 wt % with respect to the total dry mix and fillers in an amount of 0–50 wt % with respect to the total dry mix, wherein the reinforcing fibres comprise from 0.1 to 5 wt % with respect to the total dry mix of highly crystalline polypropylene fibres possessing a fibre breakage strength over 490 N/mm$^2$ and having $Q<5$ and $97<HI<100$ and $94<IPF<100$, Q being the ratio of weight-average molecular weight to number-average molecular weight, HI being the boiling n-heptane insoluble content in wt % with respect to the total polymer and IPF being the isotactic pentad fraction in mol %. In preference, the reinforcing fibres comprise from 0.3 to 4 wt % with respect to total dry mix of highly crystalline polypropylene fibres.

Said fibres contained initially from 0.05 to 10 wt % of a hydrophilizing agent which has been made practically insoluble on the fibre surface by reacting with calcium ions. Preferably said hydrophilizing agent is an alkyl phosphate alkali metal salt, with 8 to 18 carbon atoms.

If the content of the alkyl phosphate alkali metal salt is less than 0.05 wt %, the dispersion of the fibre is insufficient but if it exceeds 10 wt %, the effect of same is not improved. Preferably a sodium or potassium salt is used.

Q is the ratio of weight-average molecular weight to number-average molecular weight.

In the present application, Q was measured using the Gel Permeation Chromatography Method (GPC).
(a) Measuring machine : ALC/GPC TYPE 150C, Waters Laboratory Co.
(b) Column: TSK-GER GMH6-HT (high temperature type)
(c) Solvent: orthodichlorobenzene (ODCB)
(d) Temperature: 135° C.
(e) Detector: differential thermal refractometer
(f) Volume of flowing solvent: 1 ml/min.

Under the above conditions, a sample of highly crystalline polypropylene yielded the following results:

| Polymer | Mn | Mw | Q (Mw/Mn) | MFR (g/10 min) |
| --- | --- | --- | --- | --- |
| Highly crystalline-polypropylene | 40,000 | 140,000 | 3.5 | 1, 5 | where:

Mw: the weight-average molecular weight,
  Mw=[ΣNiMi²]/[ΣNiMi];
Mn: the number-average molecular weight,
  Mn=[ΣNiMi]/[ΣNi];
Q: the ratio Mw/Mn;
MFR: the melt flow range.

Generally, the ratio of weight-average molecular weight/number-average molecular weight is used as the measure for the degree of polydispersity, and when this value is greater than 1 (monodispersity), the molecular weight distribution curve becomes broader. The value is also higher as the polymer becomes more highly branched.

HI or the n-heptane insoluble matter is measured by fully dissolving 5 g of polypropylene sample in 500 ml of boiling xylene, charging the mixture into 5 liters of methanol to recover the precipitate, drying it and extracting in boiling n-heptane for 6 hours according to Soxhlet process to obtain an extraction residue. HI value is given in wt% with respect to the total polymer.

IPF or the isotactic pentad fraction is measured on the n-heptane insoluble matter, according to the method proposed in "Macromolecules", vol. 6, 925 (1973) and vol. 8, 697 (1975).

The density of the polypropylene in the pellet state is about 0.905 which is not substantially different from that of ordinary polypropylene.

The highly crystalline polypropylene fibres possess preferably a fibre breakage strength of 740 N/mm² or more and have $Q \leq 4.5$ and $HI \geq 98$ and $IPF \geq 96$. The denier (d) of the fibres is in a range of $0.5 < d < 20$.

The fibres can be cut in a non-uniform length range of from 2 to 15 mm, preferably the fibre length ranges between 5 to 10 mm. The fibre section may be circular or of an irregular shape such as X or Y shape. The fibres may be crimped during or after being drawn. the technique to crimp the fibres may include mentions such as false twist, air entangling treatment (containing TASLAN treatment) or compression processing (i.e., stuffing box).

The fibres may also comprise fillers, such fillers may be for example: calcium carbonate, amorphous silica, natural and synthetic calcium silicates and other minerals.

The melt flow range (MFR) of the polypropylene is in a range of $1 < MFR < 100$, preferably $5 < MFR < 30$ and most preferably $10 < MFR < 20$. The melt flow range (MFR) is measured at 190° C. by the rate through the nozzle (unit: g/10 min, JIS K7210, load 2.169 kg).

The melt spinning temperature of the fibres is to be held relatively low in order to reduce entangling or folding of molecules, said temperature is preferably in a range of 260° to 280° C.

The drawing temperature is preferably 140° to 150° C. to improve the drawing performance as far as possible.

The polypropylene fibres are added in an amount of 0.1 to 5 wt %, preferably 0.3 to 4 wt % with respect to the total dry mix. When the fibre content is less than 0.1 wt %, the reinforcing effect is not obtained and when it exceeds 5 wt %, the bending strength of the composite is suddenly lowered.

DETAILED DESCRIPTION

The invention will be described hereinbelow in a more detailed way. For the sake of simplicity, reference will be made to cement as the preferred binder in the present description. All other hydraulically setting binders, however, can be employed in place of cement. Suitable hydraulically setting binders are to be understood as meaning materials which contain an inorganic cement and/or an inorganic binder or adhesive which is hardened by hydration. Particularly suitable binders which are hardened by hydration include, for example, Portland cement, high-alumina cement, iron Portland cement, trass cement, slag cement, gypsum, calcium silicates formed on autoclave treatment, and combinations of individual binders.

The most diverse fillers and additives, which, for example, can have a beneficial influence on the pore structures of a cement block or, for example, can improve the drainage behaviour of the suspensions on the draining machines, are frequently also added to the binders. Possible additives of this type are materials such as fly ash, amorphous silica, ground quartz, ground rock, clays, blast-furnace slags, pozzolanes carbonates and the like.

The shaped solid article according to the invention may further comprise inorganic fibres or organic fibres other than polypropylene fibres.

When other synthetic organic fibres are used in combination with polypropylene fibres, the total amount of reinforcing fibres shall remain between 0.3 and 5 wt % of the total dry mix. The ratio of the amount of other synthetic reinforcing organic fibres to the total amount of reinforcing fibres shall be between 0.1 and 0.9. Examples of such fibres are : polyacrylonitrile, polyvinylalcohol, polyamide, polyester, aramide, carbon and polyolefins.

Alternatively, in case natural or synthetic inorganic fibres are used in combination with polypropylene fibres, the total amount of the fibre combination may be between 2 and 20 wt % with respect to the total dry mix. The amount of polypropylene fibre used in such combinations shall be between 0.3 and 5 wt % with respect to the total dry mix. Examples of inorganic fibres are: glass fibres, rockwool, slagwoll, wollastonite, asbestos, sepiolite, ceramic fibres and the like.

The manufacture of the fibres used according to the invention is not a subject of the present patent application. It is carried out, for example, by a known melt spinning process. These high-strength fibres can be manufactured, for example, as follows:

MANUFACTURE OF THE POLYPROPYLENE FIBRES

Polypropylene resin pellets having a melting point of 165° C. and Q=3.5, HI=98%, IPF=97% and a melt flow range of 15 g/10 min are spun at 275° C. and the fibre is drawn in a hot drum dry process at 150° C. by a factor of 4.5, impregnated by the surfactant, let stand overnight and dried in air. The fibre obtained has a denier size of 1.9, a tensile strength of 770 N/mm² and an elongation at break of 25%. The fibre is cut before using in building material mixtures. The surfactant used is a normal alkyl phosphate metal salt with 8 to 18 carbon atoms, such as potassium lauryl phosphate, potassium decylphosphate or potassium tridecylphosphate. The amount of surfactant is between 0.5 and 3% of the weight of the fibre.

PREPARATION OF THE MIXTURES FOR PROCESSING ON HATSCHEK MACHINE

Kraft cellulose pulp refined to 65° SR (Shopper-Riegler) was mixed with amorphous silica, inert fillers, cement and synthetic fibres at a solids concentration of 200 g/l of total suspension.

This slurry of fibre cement suspension was further diluted with water to a concentration of 30 g/l and then transferred into the vat of a Hatschek machine.

Shortly before running the slurry into the vat, an additional 200 ppm of a flocculation agent of the polyacrylamide type is added to improve the cement retention.

Plates were produced on the machine with 18 revolutions of the format roller, said plates being then pressed between oiled steel templates with a stack press at a specific applied pressure of 250 bar to an average thickness of 6 mm.

The sheets were cured under plastic covering for 28 days at 100% relative humidity and 20° C.

The mechanical tests were carried out in the wet state i.e. in water saturated conditions according to ISO4150.

The flexural strength of the samples was determined with an Instron mechanical tester using a classical 3 points bending test. The device records the stress-strain curve from which the results are computed as follows:
MOR is the Modulus of Rupture expressed in Newtons per square millimeter (N/mm$^2$) given by the formula:

$$MOR = M/W$$

where:
M = (the breaking load in Newtons × the distance between the supports)/4
W = ([average value of the thickness of the sample]$^2$ × the dimension of the sample measured parallel to the supports)/6

The work of fracture at maximum load (IMOR) expressed in Joules per square meter (J/m$^2$) is the integral of the stress-strain function up to the breaking load P.

The work of fracture (IPL20) is the integral of the stress-strain function also expressed in J/m$^2$ up to the point where the load (ordinate of the curve) has decreased down to 20% of the maximum value P attained.

As it can be seen from the wet state test, the article according to the present invention is more ductile and has a strength comparable to that obtained with the best reinforcing fibres currently used in fibre reinforced cement articles.

EXAMPLES 1 TO 3

The following compositions were prepared and cured under plastic covering for 28 days at 100% relative humidity and 20° C. and then submitted to an accelerated ageing test which consisted in the following cycles:
1. Immersion in water at 20° C. for 72 hours;
2. Drying in a heating cabinet at 80° C. for 72 hours.

The above treatment was repeated 8 times and the average breaking energy in both directions with respect to fibre orientation in the sheet was determined under water saturated conditions.

Using the fibre according to the invention, one observes the initial breaking energy is not only much higher than with conventional fibres, but after 8 cycles of water/heat treatment, this energy is entirely conserved whereas the other fibrse have lost more than 50% of their effectiveness. The results are given in the table I herebelow.

TABLE I

| Composition (kg) | 10 | 11 | 12 | 13 | Breaking energy (KJ/m$^2$) Using the corres. fibre | |
|---|---|---|---|---|---|---|
| | | | | | At 28 days | After 8 cycles |
| PVA | 2 | — | — | — | 5.0 | 2.0 |
| PAN | — | 2 | — | — | 2.5 | 1.0 |
| PVA modified | — | — | 2 | — | 2.5 | 1.0 |
| PP (*) | — | — | — | 2 | 9.2 | 9.2 |
| Cellulose 35° SR | 4 | 4 | 4 | 4 | | |
| Inert filler CaCO$_3$ | 13 | 13 | 13 | 13 | | |
| Amorphous silica | 2 | 2 | 2 | 2 | | |
| Cement | 79 | 79 | 79 | 79 | | |
| Total (kg) | 100 | 100 | 100 | 100 | | |

(*) Polypropylene fibre according to the invention

Of course, the invention is not limited to the embodiments which have been described and shown by way of non-limiting examples, and numerous changes and modifications may be practised within the scope of the appended claims.

We claim:
1. Shaped solid article manufactured with a hydraulically setting composition comprising water, hydraulic binders, reinforcing fibres and fillers ranging from a finite amount up to 50 wt % with respect to the total dry mix, characterized in that the reinforcing fibres comprise from 0.1-5 wt % with respect to the total dry mix of highly crystalline polypropylene fibres processing a fibre breakage strength of over 490 N/mm$^2$, having Q<5 and 97<HI<100, and 94<IPF<100, Q being the ratio of weight-average molecular weight to number-average molecular weight, HI being the boiling n-heptane insoluble content in wt % with respect to the total polymer and IPF being the isotactic pentad fraction in mol %.
2. Article according to claim 1, characterized in that the reinforcing fibres comprise from 0.3 to 4 wt % with respect to the total dry mix of highly crystalline polypropylene fibres.
3. Article according to claim 1, characterized in that the polypropylene fibres possess a fibre breakage strength of 740 N/mm$^2$ or more and have Q≦4.5, HI≧98 and IPF≧96.
4. Article according to claim 1, characterized in that the denier (d) of the polypropylene fibres is in the range of 0.5<d<20.
5. Article according to claim 1, characterized in that the polypropylene fibre length ranges from 2 to 15 mm.
6. Article according to claim 1, characterized in that the polypropylene fibre length ranges between 5 and 10 mm.
7. Article according to claim 1, characterized in that the polypropylene fibre section is circular.
8. Article according to anyone of claim 1, characterized in that the polypropylene fibres have an irregular, substantially X-shaped cross-section.
9. Article according to anyone of claim 1, characterized in that the polypropylene fibres have an irregular, substantially Y-shaped cross-section.
10. Article according to claim 1, characterized in that the polypropylene fibres are crimped.
11. Article according to claim 1, characterized in that the polypropylene fibres comprise fillers.

12. Article according to claim 1, characterized in that the reinforcing fibres further comprise synthetic organic fibres other than polypropylene fibres.

13. Article according to claim 1, characterized in that the reinforcing fibres further comprise inorganic fibres.

14. An article according to claim 1 wherein the polypropylene fibres contain from 0.05 to 10 weight percent of a hydrophilizing agent.

15. An article according to claim 14 wherein the hydrophilizing agent is an alkyl phosphate alkali metal salt having 8 to 18 carbon atoms.

16. An article according to claim 15 wherein the alkali metal is sodium or potassium.

* * * * *